United States Patent [19]

Abel

[11] 4,338,053

[45] Jul. 6, 1982

[54] CARGO RETAINER

[75] Inventor: Alan S. Abel, Appleton, Wis.

[73] Assignee: N P Marketing Corporation, Neenah, Wis.

[21] Appl. No.: 169,848

[22] Filed: Jul. 17, 1980

[51] Int. Cl.³ .............................................. B61D 45/00
[52] U.S. Cl. ....................................... 410/94; 206/821; 248/346; 411/461
[58] Field of Search ................. 410/94, 121, 128, 132, 410/151; 188/6, 8; 411/461; 248/346, 346.1; 206/821

[56] References Cited

U.S. PATENT DOCUMENTS

| | | | |
|---|---|---|---|
| 2,068,044 | 1/1937 | Weers, Jr. ................................ | 188/8 |
| 2,688,493 | 9/1954 | Rosenberg ............................. | 188/6 |
| 4,147,112 | 4/1979 | Green et al. ........................... | 410/94 |

Primary Examiner—Richard A. Bertsch
Attorney, Agent, or Firm—Andrus, Sceales, Starke & Sawall

[57] ABSTRACT

A cargo retainer, having a floor contacting member provided with an upwardly facing load bearing surface and an upright member secured adjacent to the rear end of the floor contacting member, is provided with a floor piercing element. The floor piercing element is movably mounted adjacent to the juncture between the floor contacting member and the upright member and is movable relative to the cargo retainer between a position of relatively shallow floor piercing engagement and a position of substantially deeper floor piercing engagement. A member projects from the cargo retainer adjacent to the juncture between the floor contacting member and the upright member in planar alignment with the floor piercing element and serves to drive the floor piercing element from a shallow engagement position to a deeper engagement position with rearward movement of the cargo retainer and thereby limit such movement in service. Means are further provided on the cargo retainer for engagement with the floor piercing element to effect removal of the element with forward movement of the cargo retainer in service. After forward movement of the cargo retainer in service, the floor piercing element is driven to reestablish a piercing engagement with the floor.

10 Claims, 8 Drawing Figures

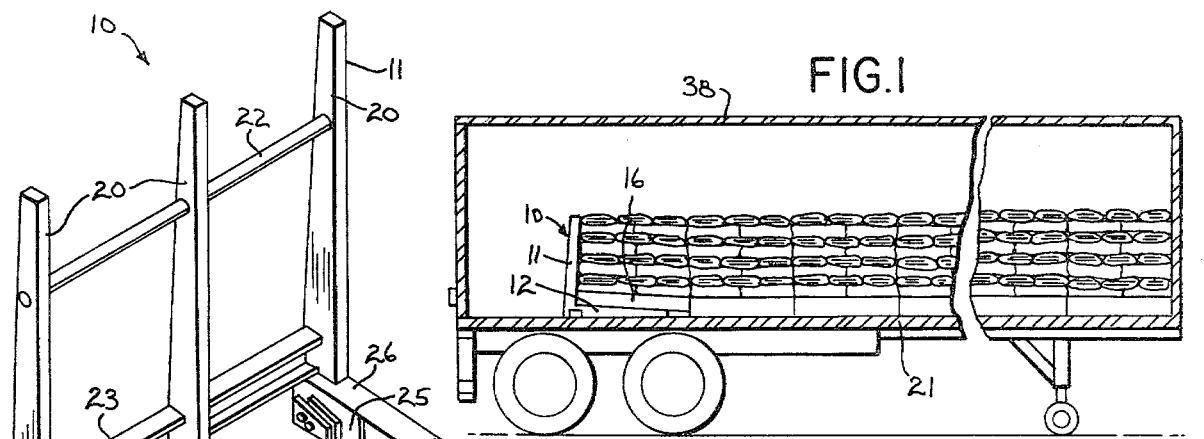
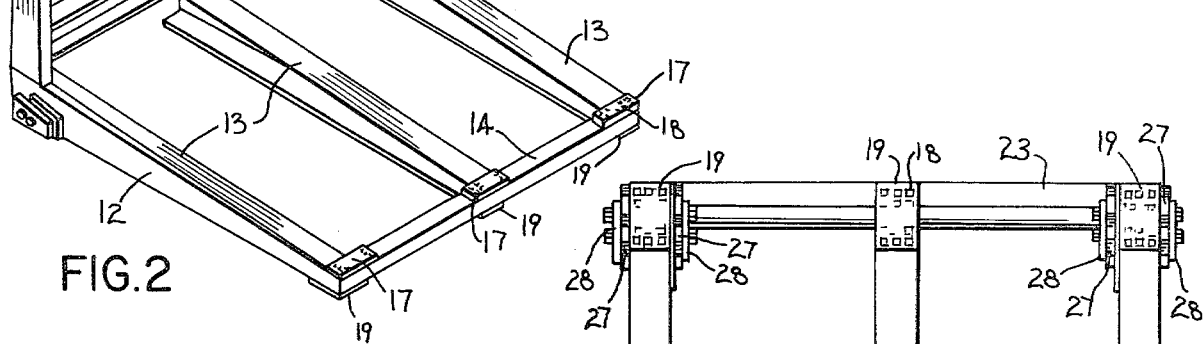
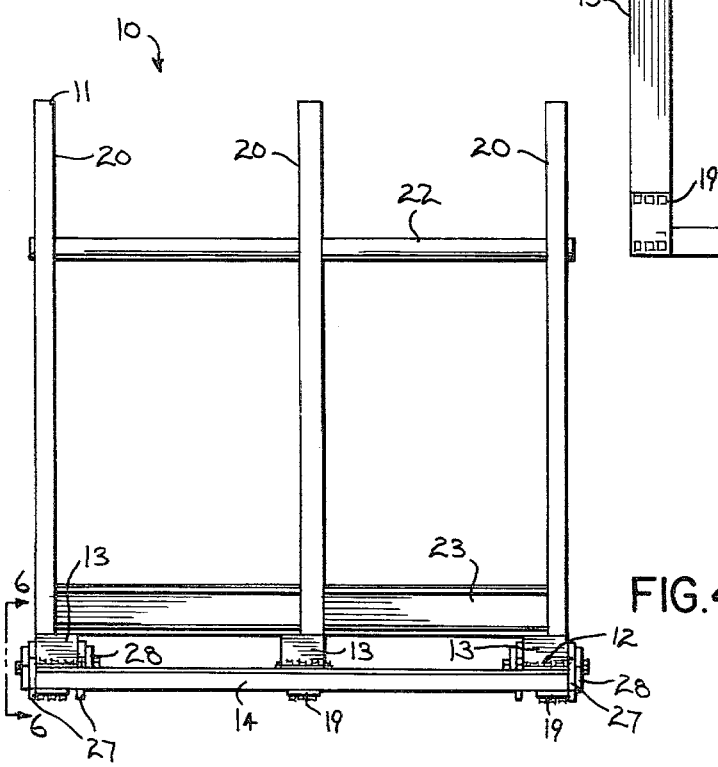

CARGO RETAINER

BACKGROUND OF THE INVENTION

This invention relates to an improved cargo retainer for generally maintaining the integrity of a cargo load both as to its compactness and its location within a carrier. Such retainers find utility, particularly for palletized cargo, in carriers having wood floors including railroad cars, trucks, ships, airplanes, and within the receptacles for containerized shipping.

Unless a cargo load is adequately secured within its carrier, it is apt to move or shift which generally results in damaged lading, and also frequently, damage to the carrier. Heretofore, shippers have generally found it necessary to rely on banding, blocking and/or bracing to secure the cargo load and provide for its integrity. Such practices, however, are not only time consuming and costly, but also rely heavily on individual judgment for their adequacy.

U.S. Pat. No. 4,147,112 issued to Green et al. relates to a cargo support or retainer which tries to substantially or wholly avoid the necessity for the practices of banding, blocking and/or bracing. Cargo support units made generally according to U.S. Pat. No. 4,147,112, however, failed to provide for load integrity at least when used in truck trailers mounted for piggy-back service on railroad cars. It is generally an object of this invention to improve upon such cargo support units and assure the capability to provide for load integrity even under the severe demands imposed upon truck trailers mounted for piggy-back service on railroad cars.

SUMMARY OF THE INVENTION

According to the invention a cargo retainer, having a lower floor contacting member provided with an upwardly facing load bearing surface and an upright member secured adjacent to the rear end of the floor contacting member, includes a floor piercing element movably mounted adjacent to the juncture between the floor contacting member and the upright member. The floor piercing element is movable relative to the cargo retainer between a position of relatively shallow floor piercing engagement and a substantially deeper floor piercing engagement. And means are provided on the cargo retainer adjacent to the juncture between the floor contacting member and the upright member to drive the floor piercing element from one engagement position to a deeper engagement position with rearward movement of the cargo retainer and thereby limit such movement in service.

Further means are provided on the cargo retainer for engagement with the floor piercing element to remove said element from floor piercing engagement with forward movement of the cargo retainer in service. With forward movement of the cargo retainer in service, the floor piercing element is driven to reestablish a piercing engagement with the floor.

DESCRIPTION OF THE DRAWING FIGURES

The drawings furnished herewith illustrate the best mode presently contemplated for carrying out the invention and are described hereinafter.

In the drawings:

FIG. 1 is a sectional elevational view of a loaded truck trailer showing the cargo retainer of this invention in service;

FIG. 2 is a perspective view of the improved cargo retainer of this invention;

FIG. 3 is a bottom view of the cargo retainer of FIG. 2;

FIG. 4 is a frontal view of the cargo retainer of FIG. 2;

DESCRIPTION OF THE ILLUSTRATED EMBODIMENTS

Figure 6:
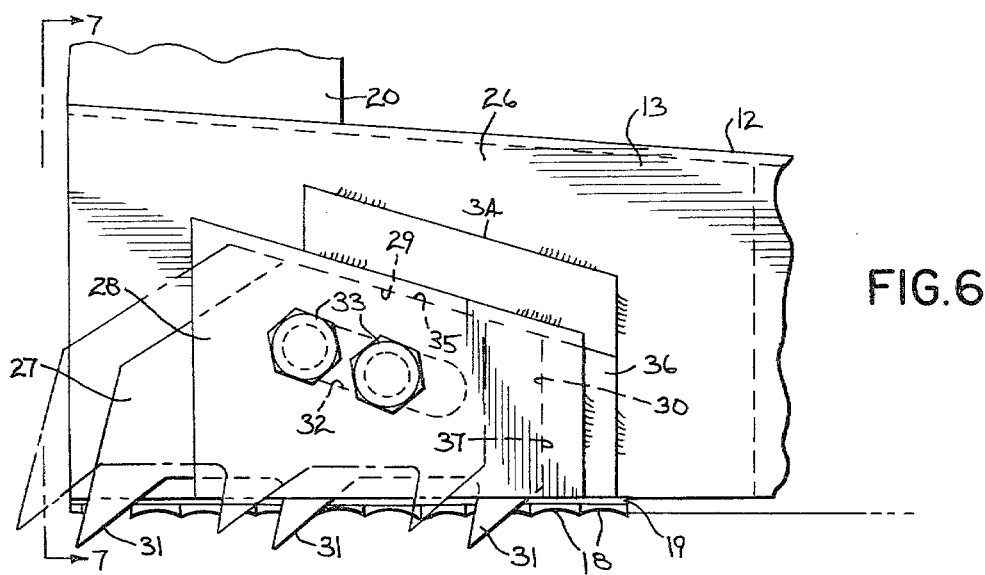
FIG. 6 is a detail view taken generally along the line 6—6 of FIG. 4 showing the toothed slide member in relatively deep penetration of the floor, and in phantom lines shows the toothed slide member in substantially shallower penetration of the floor.

Referring to the drawings, the cargo retainer 10 comprises a generally L-shaped unit wherein the lower end of a generally vertical upright frame portion 11 is joined adjacent to the rear extremity of a generally horizontal floor contacting frame portion 12.

The floor contacting frame portion 12 generally comprises three transversely spaced legs 13 which are connected at their forward or remote end by a transversely extending brace member 14. The spacing between the legs 13 generally corresponds to the spacing between the framing runners 15 of the cargo pallets 16 so that in service the pallet runners are disposed over the cargo retainer legs. The legs 13 are tapered toward their remote end to provide a lesser depth forwardly so that the pallet 16 resting thereon in service assumes an incline in the direction away from the upright portion 11. Plates 17 with upwardly projecting cleats 18 formed by perforations in the plates are secured to the upper surface of the brace member 14 adjacent to each leg 13 to generally prevent sidewise movement of the pallet 16 relative to the cargo retainer 10. Generally similar plates 19 with downwardly projecting cleats 18 are secured adjacent to the respective ends of the bottom floor contacting surface of the several legs 13 as shown in FIG. 3.

Figure 5:
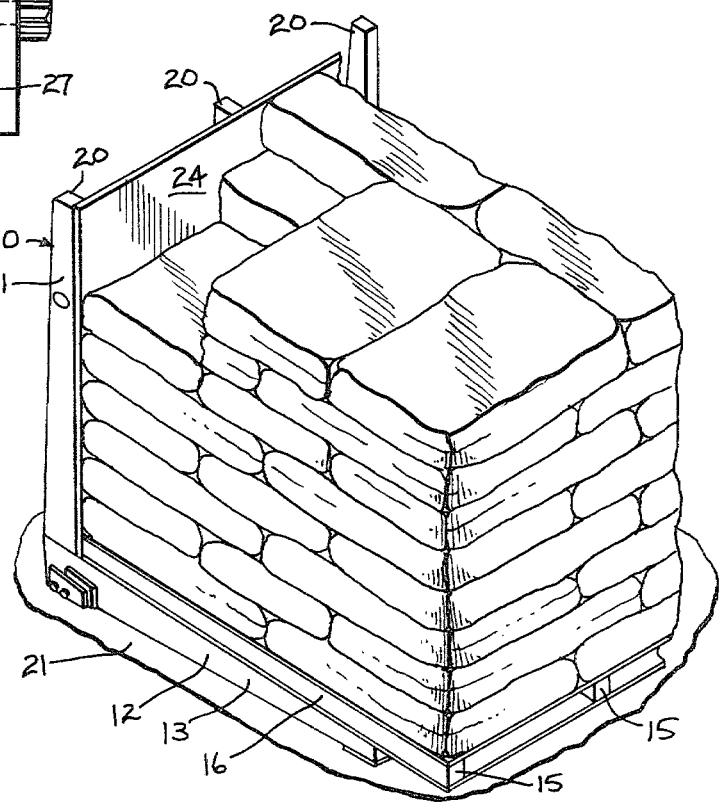
FIG. 5 is a view generally similar to that of FIG. 2 and shows a loaded pallet in place on the cargo retainer with parts broken away and a backing board disposed vertically adjacent to the upright frame portion.

The upright frame portion 11 generally comprises three transversely spaced posts 20 which extend upwardly from the corresponding legs 13. The posts 20 extend generally normal to the tapered legs 13 so that the frame portion 11 is inclined forwardly relative to the floor 21. The posts 20 may taper to have a lesser depth at their upper end as generally shown in FIG. 2. Adjacent to their upper end, a brace member 22 extends between and is connected to the posts 20. A lower brace member 23 extends between and is connected to the posts 20 adjacent to their juncture with the legs 13 and is thus disposed in spaced relation to the floor 21 while also serving to provide bracing for the rearward ends of legs 13. In service, a backing board 24 is usually vertically disposed between the upright frame portion 11 and the cargo loaded on the pallet 16 as generally shown in FIG. 5.

Figure 7:
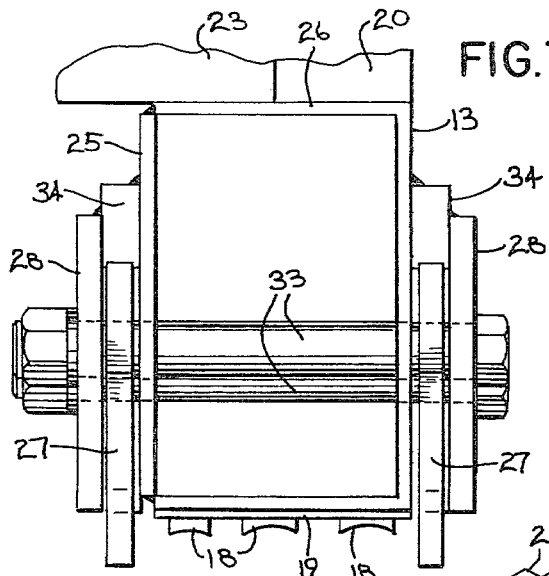
FIG. 7 is a detail view taken generally along the line 7—7 of FIG. 6.

The outer legs 13 of the floor contacting portion 12 are formed as channel section members which open inwardly in facing relation as generally shown in FIGS. 2 and 7. At the rear of the outer legs 13 adjacent to the juncture with the upright portion 11, a filler plate 25 extends across the channel to form a box section portion 26 as perhaps best shown in FIG. 7.

The rear box section portion 26 of the respective outer legs 13 each support a pair of spaced members 27 slideable relative to the cargo retainer 10 to thus provide a total of four (4) such members on the retainer. The members 27 are slideably confined on opposite sides of the legs 13 between the respective legs and corresponding outer support members 28 secured to the legs.

Figure 8:
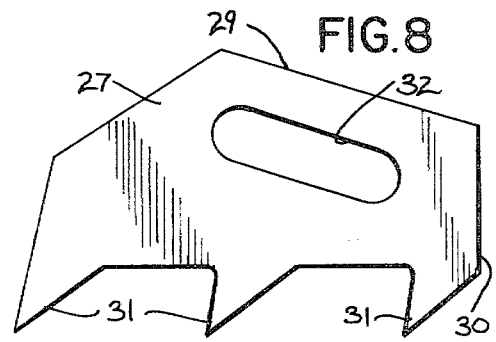
FIG. 8 is an elevational view of the toothed slide member.

The members 27 are depicted in FIG. 8 and include upper and forward bearing surfaces 29 and 30 respectively. The upper bearing surface 29 slopes downwardly in the forward direction while the forward bearing surface 30 is generally vertical. The lower portion of members 27 are provided with a plurality of longitudinally spaced teeth 31 that project downwardly and rearwardly. Intermediate the bearing surface 29 and the teeth 31, members 27 are provided with a slot 32 which generally parallels the bearing surface 29.

The members 27 are slideably disposed on a pair of spaced pins or bolts 33 which extend through the box section portion 26, the slot 32 of the members 27, and the outer support members 28. The plane defined by the bolts 33 also generally parallels the bearing surface 29. As generally shown in FIG. 6, the length of the slot 32 provides for movement of members 27 between positions effecting a relatively shallow penetration of a wood floor 21 as shown in phantom lines and a substantially deeper penetration shown in solid lines. The bolts 33 are afforded some vertical clearance in the slots 32 of the members 27.

A guide member 34 is carried by the leg 13 and has a lower surface 35 that slopes downwardly and forwardly to generally parallel the bearing surface 29 on member 27 as shown in FIG. 6. Guide member 34 is in planar alignment with the member 27 such that the lower surface 35 slidingly bears on the bearing surface 29. A stop member 36 is also carried by the leg 13 in planar alignment with the member 27 and has a generally vertical rearward surface 37 paralleling the bearing surface 30 of the member 27.

In the use of the cargo retainer 10, a fork lift unit or truck is generally utilized and initially seats the load on the retainer from the front. In the case of a palletized load as shown in FIG. 5, the framing runners 15 of the pallet 16 are seated directly over the legs 13. After the load is properly seated on the cargo retainer 10, the retainer and load together are picked up from the rear and moved into transport location. For loading onto a truck trailer 38 as illustrated in FIG. 1, only the last loaded pallet is seated on a cargo retainer 10 to secure the integrity of the load in the fore and aft direction between the retainer and the front end of the trailer.

When the trailer 38 is mounted on a railroad car for piggy-back service, rather severe demands are imposed upon the load and the trailer. The trailer 38 and its cargo likely will be subjected to impacts from the front and/or back particularly during humping or freight car sorting procedures in rail yards.

In the process of loading the palletized load and retainer 10 together as in the trailer 38 of FIG. 1, the final jostling and maneuvering by the fork lift unit to properly seat the load and its retainer most often results in the teeth 31 of member 27 making only a shallow penetration of the floor 21 as the lower surface 35 of the guide member 34 bears down on the bearing surface 29 of the member 27 as generally illustrated by the phantom line position in FIG. 6. A frontal impact of sufficient severity, when the trailer 38 is mounted for piggy-back rail service, will cause the retainer 10 and its load to move rearwardly in the trailer. Such movement will cause the rearward surface 37 of the stop member 36 to impact upon the forward bearing surface 30 of member 27 to interrupt the rearward movement of the retainer while the guide member 34 in bearing engagement with member 27 effects a deeper penetration of the floor by the teeth 31 to thus restrain the cargo retainer 10 and thereby maintain cargo integrity. With a rear impact, the cargo retainer 10 and its load will tend to move forwardly in the trailer 38. If some voids have been created in the trailer load such that the retainer 10 can move forwardly upon a rear impact of sufficient severity, the bolts 33 will pull the teeth 31 of member 27 from the floor as the retainer moves forwardly to resecure load integrity. In the new position of cargo retainer 10, the guide member 34 will reseat the member 27 to again impale the teeth 31 into the floor 21.

While FIG. 1 illustrates only how the cargo retainers 10 might be utilized to restrain a cargo load in the fore and aft direction, they might also be used to restrain lateral movement when necessary and/or desired.

Various modes of carrying out the invention are contemplated as being within the scope of the following claims particularly pointing out and distinctly claiming the subject matter which is regarded as the invention.

I claim:

1. In a cargo retainer having a lower floor contacting member provided with an upwardly facing load bearing surface and an upright member secured adjacent to the rear end of the floor contacting member, a floor piercing element movably mounted on the cargo retainer adjacent to the juncture between the floor contacting member and the upright member, said element being movable relative to the cargo retainer between a position of relatively shallow floor piercing engagement and a position of substantially deeper floor piercing engagement, and means on the cargo retainer adjacent to the juncture between the floor contacting member and the upright member to drive the floor piercing element from one engagement position to a deeper engagement position with rearward movement of the cargo retainer and thereby limit such movement in service.

2. The structure as set forth in claim 1 wherein further means are provided on the cargo retainer for engagement with the floor piercing element to remove said element from floor piercing engagement with forward movement of the cargo retainer in service, said floor piercing element being driven to reestablish a piercing engagement with the floor following any such forward movement of the cargo retainer.

3. The structure as set forth in claim 2 wherein the further means for removing the floor piercing element from floor piercing engagement comprises pin means which extend through a slot in the floor piercing element.

4. The structure as set forth in claim 1 wherein the means for driving the floor piercing element into a deeper floor engagement position comprises a member projecting from the cargo retainer and which is engageable with the floor piercing element.

5. The structure as set forth in claim 1 wherein a plurality of movable floor piercing elements and corresponding means for driving the floor piercing element into a deeper floor engagement position are provided on the cargo retainer adjacent to the juncture between the floor contacting member and the upright member.

6. The structure as set forth in claim 1 wherein the floor piercing element is provided with a plurality of spaced teeth for piercing the floor.

7. The structure as set forth in claim 6 wherein the teeth project downwardly and rearwardly.

8. The structure as set forth in claim 1 wherein the floor contacting member comprises a plurality of transversely spaced legs which extend forwardly from the juncture with the upright member, and a floor piercing element and corresponding means for driving the floor piercing element into a deeper floor engagement position are provided on opposite sides of at least one of the floor contacting member legs.

9. The structure as set forth in claim 8 wherein the floor piercing elements and corresponding means for driving the floor piercing element into a deeper floor engagement position are provided on opposite sides of at least the outermost legs of the floor contacting member.

10. In a device for restraining a cargo load, an elongated floor contacting member provided with an upwardly facing load bearing surface, said member being adapted to project forwardly beneath the cargo load, a generally upright member secured to the floor contacting member in spaced relation from the forward end of the floor contacting member for engaging with the cargo load, a floor piercing element movably mounted on the floor contacting member adjacent to the rearward end thereof, said element being movable between a position of relatively shallow floor piercing engagement and a position of substantially deeper floor piercing engagement, and means on the floor contacting member to drive the floor piercing element from one floor engagement position to a deeper engagement position with rearward movement of the cargo restraining device and thereby limit the movement of the restraining device in service.

* * * * *

UNITED STATES PATENT AND TRADEMARK OFFICE
CERTIFICATE OF CORRECTION

PATENT NO. : 4,338,053
DATED : July 6, 1982
INVENTOR(S) : ALAN S. ABEL

It is certified that error appears in the above-identified patent and that said Letters Patent are hereby corrected as shown below:

Column 2, Line 38, Cancel "away from" and substitute therefor ----toward----;
Column 4, Line 67, Cancel "element" and substitute therefor ----elements----;
Column 5, Line 20, Cancel "element" and substitute therefor ----elements----.

Signed and Sealed this

Fifth Day of October 1982

[SEAL]

Attest:

GERALD J. MOSSINGHOFF

Attesting Officer          Commissioner of Patents and Trademarks